United States Patent
Roberts

(10) Patent No.: US 10,325,461 B1
(45) Date of Patent: Jun. 18, 2019

(54) DYNAMIC SECURITY PATROL GUIDANCE SYSTEM

(71) Applicant: SureView Systems, LLC, Tampa, FL (US)

(72) Inventor: Paul Roberts, St. Petersburg, FL (US)

(73) Assignee: Sureview Systems, LLC, Tampa, FL (US)

(*) Notice: Subject to any disclaimer, the term of this patent is extended or adjusted under 35 U.S.C. 154(b) by 0 days.

(21) Appl. No.: 15/899,484

(22) Filed: Feb. 20, 2018

(51) Int. Cl.
| | |
|---|---|
| G08B 25/00 | (2006.01) |
| G08B 13/196 | (2006.01) |
| H04N 7/18 | (2006.01) |
| H04W 4/024 | (2018.01) |
| G08B 13/00 | (2006.01) |

(52) U.S. Cl.
CPC .......... *G08B 13/196* (2013.01); *G08B 25/00* (2013.01); *G08B 25/008* (2013.01); *H04N 7/181* (2013.01); *H04W 4/024* (2018.02); *G08B 13/00* (2013.01)

(58) Field of Classification Search
CPC .... G08B 21/00; G08B 21/0476; G08B 25/00; G08B 25/001; G08B 25/003; G08B 25/009; G08B 25/10; G08B 25/008; G08B 25/016; G08B 25/14; G08B 13/00; G08B 29/00; G08B 29/02; H04N 7/181
See application file for complete search history.

(56) References Cited

U.S. PATENT DOCUMENTS

| | | | |
|---|---|---|---|
| 2011/0018998 A1* | 1/2011 | Guzik | H04N 21/21 348/143 |
| 2016/0232777 A1* | 8/2016 | Jedwab | G08B 25/001 |

* cited by examiner

*Primary Examiner* — Benyam Haile
(74) *Attorney, Agent, or Firm* — Nicholas Pfeifer; Smith & Hopen, P.A.

(57) ABSTRACT

A security patrol guidance system and method configured to automatically and dynamically identify patrol areas within a geospatial boundary and notify the security guards of said areas. The system and method considers recent security alerts, non-visible areas, and SMP operator identified patrol areas in view of the current locations of each security guard to create a patrol list. The patrol list includes areas deemed to be at risk of future security event and the system instructs security guards to patrol said areas at certain intervals. The system is constantly updating to ensure that a desired level of security is achieved at all times.

17 Claims, 5 Drawing Sheets

DYNAMIC SECURITY PATROL GUIDANCE SYSTEM

BACKGROUND OF THE INVENTION

1. Field of the Invention

This invention relates, generally, to security systems. More specifically, it relates to an automated security guard guidance system.

2. Brief Description of the Prior Art

Effectively securing an asset or facility typically requires numerous and various types of security systems, most of which are disparate systems lacking an ability to easily interact with each other. Ideally, these disparate security systems can be monitored and controlled by a single security-monitoring platform (SMP). An SMP is designed to integrate disparate security systems by aggregating the system-specific information into a single interface. Effectively, the SMP provides operator(s) with an enhanced level of situational awareness when responding to security alerts.

Security systems include, but are not limited to, video systems, door access control systems to control who can access the location or areas within, intrusion detection systems to detect intruders (for example motion detection sensors or thermal detection sensors), audio systems to provide one-way or two-way audio communications, lone worker GPS-enabled devices with a panic button for guards, and situational awareness systems to provide information outside of traditional alarm sources, such as earthquake and weather warnings. Each security system usually contains several types of security monitoring assets (SMAs). An SMA includes, but is not limited to, any alarm source, video source, output, security personnel, or audio source used to secure an object, facility, or person. Each security monitoring asset provides different operational capabilities, including but not limited to:

- Security alert sources 103: when triggered raise an alert (such as a door or window being forced open or a motion sensor being triggered) to the SMP operator, which the operator must process. The security alerts can also include location information if the security alert source is moving, such as a vehicle moving outside of a geofence or a mobile guard who has raised an SOS alarm.
- Cameras 104: allow the operator to view what is happening at a location.
- Audio inputs and outputs 105: allow the SMP operator to hear what is happening at the location and also transmit sound to the location, respectively (e.g., intercoms to verify someone's identity and then let them in, and public-address systems to transmit a warning and scare off a potential intruder).
- Outputs and doors 106: allow the operator to control various systems e.g., opening gates, turning on lights, and granting access to doors.
- Security guards 107: the SMP operator can directly contact guards via a communication systems integrated with the SMP to either warn them of the security event or have them participate in the processing of the event as a local resource. The term "security guard" includes both human and robotic guards.

Typically, the various security systems by themselves lack the necessary hardware and software to interact with other security systems. For that reason, SMPs are designed to integrate several security systems into a single, more easily managed platform. Each security system includes a system-specific application programming interface (API). The API for each security system is unique to that security system, but each API provides the necessary communicability to enable a user to control and utilize the security system. For example, an API can create (1) a connection to web services inside the security system allowing a user to execute commands to query and control the security system's security monitoring assets, (2) a connection to the data store of the security system, and/or (3) a proprietary connection through a software development kit (SDK) with functions allowing a user to query and control the security system's SMAs.

Some APIs are configured to send regular "heartbeat" messages that inform the SMP of the status of a particular SMA. Moreover, SMAs may include location-based technology configured to exchange location-based information with the SMP. As a result, the SMP can pinpoint the location and movement of the SMAs and present the SMP operator or security guards with the most relevant information to properly address the security alert. Location based-technology may include, but is not limited to, a GPS, compass, altimeter, gyroscope, RFID tags, and accelerometer. While robotic security guards may include location-based technology integrated therein, human security guards may carry mobile communication devices containing location-based technology which are configured to communicate with the SMP.

Referring to FIG. 1, a simplified exemplary illustration of the communication structure between SMAs and the SMP includes SMP 101 in communication with security systems 102, and in turn their respective SMAs 103-106. SMP 101 is also in communication with security guards 107 via the mobile devices carried by human guards or location-based technology integrated with or carried by robotic guards. Once connected, SMP operator 108 is capable of interacting with a particular SMA 103-106 and security guard 107. Moreover, SMP 101 is also capable of automatically interacting with security guards 107 without input from SMP operator 108.

As depicted, SMAs 103-106, may each include location-based technology 112, which is capable of providing location and/or movement information. The SMAs may include location-based information stored in a data store accessible to SMP 101. Having location-based information in a data store is useful when one or more SMAs does not include location-based technology and in situations in which the SMA or the location-based technology is inoperable.

When securing premises, the various security systems provide a good level of coverage, however, there are often certain types of premises or areas within certain premises that require or benefit from a security guard periodically patrolling (or "touring") the premises to serve as a visible deterrent to intruders and provide a feeling of safety to staff and members of the public. For example, a patrolling security guard is beneficial in busy public areas such as shopping malls where it is hard to track everyone using cameras and also in extremely remote areas that may be seen as easy targets. Furthermore, recent advances in robotics have produced robotic guards that can be deployed to perform almost the same tasks, especially in conditions that are unfavorable to human guards, such as areas with inclement weather and vast warehouses that would require many miles of walking.

Security guard patrol routes are usually determined manually with varying detail, but the frequency and route are critical in maintaining a consistent level of protection.

Sometimes these factors are loosely determined, such as walking the outside and then the inside of a building every hour. This type of approach to establishing patrol routes has several flaws:

1. The process is static and does not change to account for things like:
   a. events occurring in a non-patrolled area, suggesting it needs to be included in a list of areas to be visited.
   b. cameras being removed or added resulting in areas that now need or no longer need patrolling.
   c. another guard already being in the area at the time of patrol thereby eliminating the need to patrol that same area.
2. The information pertaining to historical security events in a particular area or camera coverage is largely anecdotal based on human knowledge and memory, rather than being recorded as real data noting exactly how many events have occurred in an area, what date each event occurred, and exactly where the cameras are pointing in that area.

Accordingly, what is needed is an automatic and dynamic security patrol guidance system that can account for the pitfalls identified above. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an automatic and dynamic security patrol guidance system is now met by a new, useful, and nonobvious invention.

The novel method includes establishing a geospatial boundary around an object of interest; establishing wireless communication between a SMP and location-based technology in a security guard's possession; determining whether any security alerts occurred within a defined timeframe; if a security alert occurred within the defined timeframe, adding the location of the SMA responsible for the security alert to a patrol list; determining whether there are any areas within the geospatial boundary that are not in a field of view of a camera; if there is an area not within the field of view of a camera, adding the area to the patrol list; and transmitting the patrol list to the security guards via wireless communication between the SMP and the location-based technology in the security guard's possession.

In an embodiment, the step of determining whether any security alerts occurred within the defined timeframe includes accessing a data store that records historical security alert information, and comparing a current date and time with a date and time of the historical security alert information. Likewise, location information for each static SMA is stored in a data store accessible by the SMP.

An embodiment includes inputting field of view information for each camera into a data store that is accessible by the SMP. Thus, the step of determining whether there are any areas within the geospatial boundary that are not in a field of view of a camera includes accessing the data store housing the field of view information via the SMP.

An embodiment of the novel method further includes the step of identifying and adding any operator-defined patrol areas to the patrol list. An embodiment also includes the steps of accessing the location-based technology in the security guard's possession to determine if the security guard is currently or has been in one of the areas on the patrol list within a defined timeframe. If the security guard is currently or has been in one of the areas on the patrol list within a defined timeframe that area is removed from the patrol list.

An embodiment also includes the step of subdividing the geospatial boundary around the object of interest into a plurality of subareas, the subareas each identifiable based on location information.

The novel system includes a SMP configured to communicate with one or more security systems through one or more application programming interfaces. Each security system has one or more SMAs. The system further includes a mobile device intended to reside with each security guard. The mobile device has location-based technology that can transmit location-based information to the SMP. The novel system additionally includes a patrol guidance program adapted to automatically perform a series of steps.

The series of steps includes determining whether any security alerts occurred within a defined timeframe; if a security alert occurred within the defined timeframe, adding the location of the SMA responsible for the security alert to a patrol list; determining whether there are any areas within the geospatial boundary that are not in a field of view of a camera; if there is a subarea not within the field of view of a camera, adding the area to the patrol list; and wirelessly transmitting the patrol list to the security guards from the SMP to the mobile device.

An embodiment includes the additional steps of identifying and adding any operator-defined patrol areas to the patrol list, and/or accessing the security guard's mobile device to determine if the security guard is currently or has been in one of the areas on the patrol list within a defined timeframe, and removing from the patrol list any areas that the security guard is currently in or has been in within the defined timeframe.

An embodiment also includes the steps of inputting field of view information for each camera into a data store that is accessible by the SMP. Moreover, in an embodiment, the step of determining whether there are any areas within the geospatial boundary that are not in a field of view of a camera includes accessing the field of view information via the SMP.

An object of the invention is to provide a security patrol guidance system configured to automatically and dynamically identify patrol areas within a geospatial boundary and notify the security guards of said areas.

A further object of the invention is to establish a patrol list having areas deemed to be at risk of future security event and then instruct security guards to patrol said areas at certain intervals.

An object of the invention is to provide a security patrol guidance system that is constantly updating to ensure that a desired level of security is achieved at all times.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
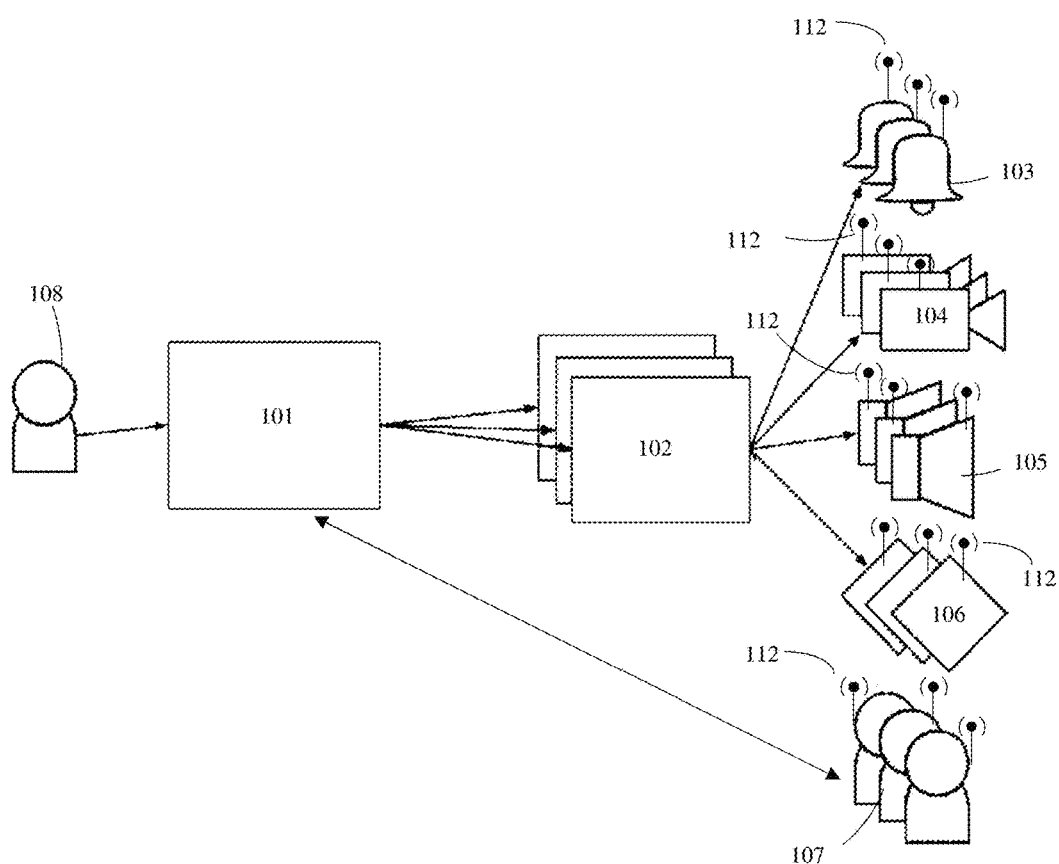
FIG. 1 is an example of a prior art communication structure between an SMP and SMAs.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a system adapted to constantly monitor security monitoring assets (SMAs) and dynamically recalculate security guard patrol routes. As depicted FIG. 2, a simplified security enterprise includes several SMAs—cameras 206-208—for monitoring building 202 residing on a plot of land 201. Cameras 206-208, as depicted, however are limited in viewing area. Door 203 and windows 204 and 205 may also be connected to an alarm system to detect when they are opened. The diagram is purposely simplified to demonstrate the concept. In reality, typical sites will be much more complicated. For example, a mall has multiple buildings, each containing multiple rooms and a large outdoor space, such as parking lots.

Even in the simplified illustration, it is apparent that cameras in combination with the door and window alarms provide a limited scope of protection. As a result, there are various areas, some marked by reference numeral 209, which should be patrolled by security guards. Areas 209 must be manually identified. Until the present invention, there did not exist a system for dynamically adjusting patrol areas. Admittedly, there are areas in addition to areas 209 that require patrolling, but FIG. 2 is simply an exemplary illustration to convey the point that there are areas within a geospatial security boundary that require security guard patrols.

An embodiment of the present invention includes a novel process for automatically and dynamically calculating areas that need to be patrolled and then disseminating the patrol routes to the security guards. As an initial step, the location-based technology or location information for each SMA must be accessible to the SMP. This involves establishing a line of communication, typically via a security system-specific API, between the SMP and each SMA's location-based technology or creating a data store, accessible by the SMP, in which location information for SMAs is stored. It is also preferable that the viewing areas of each camera are identified in a spatial manner to establish areas covered by the cameras. Finally, a digital geospatial boundary of the site, such as a geofence, is established to digitally encapsulate the entire area that must be secured.

Figure 2:
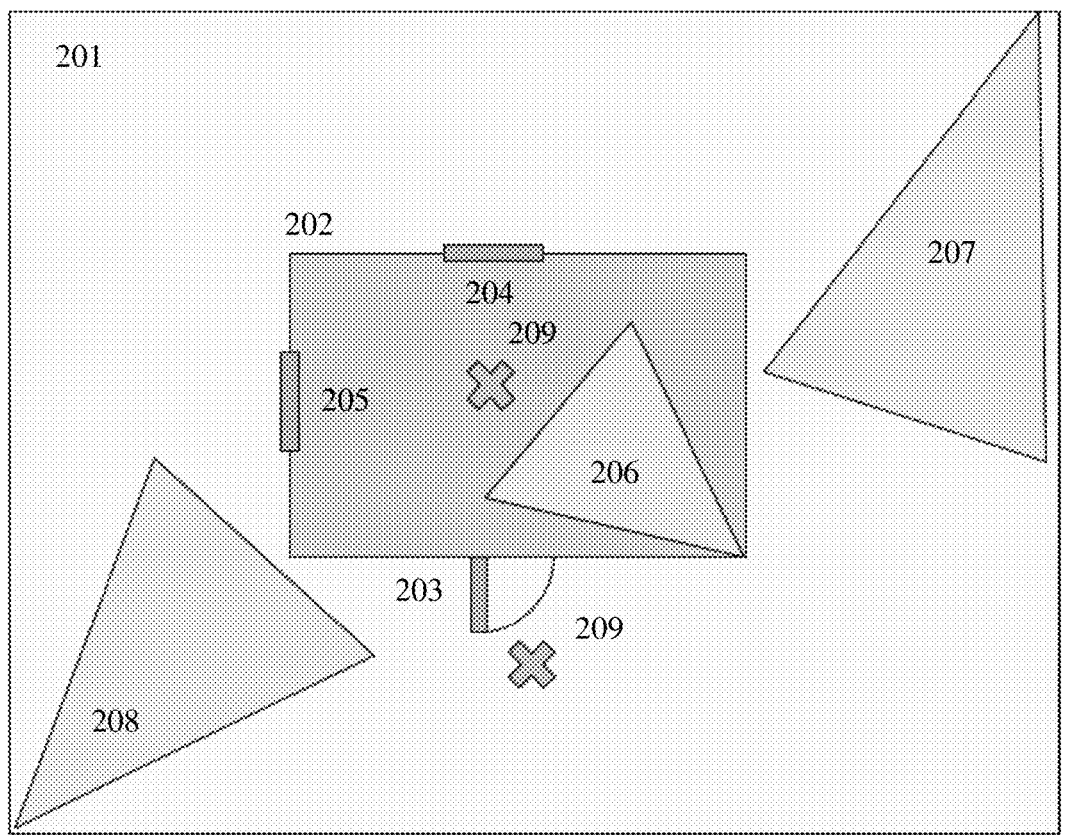
FIG. 2 is a simplified illustration of a building being monitored by security systems.
Figure 4:
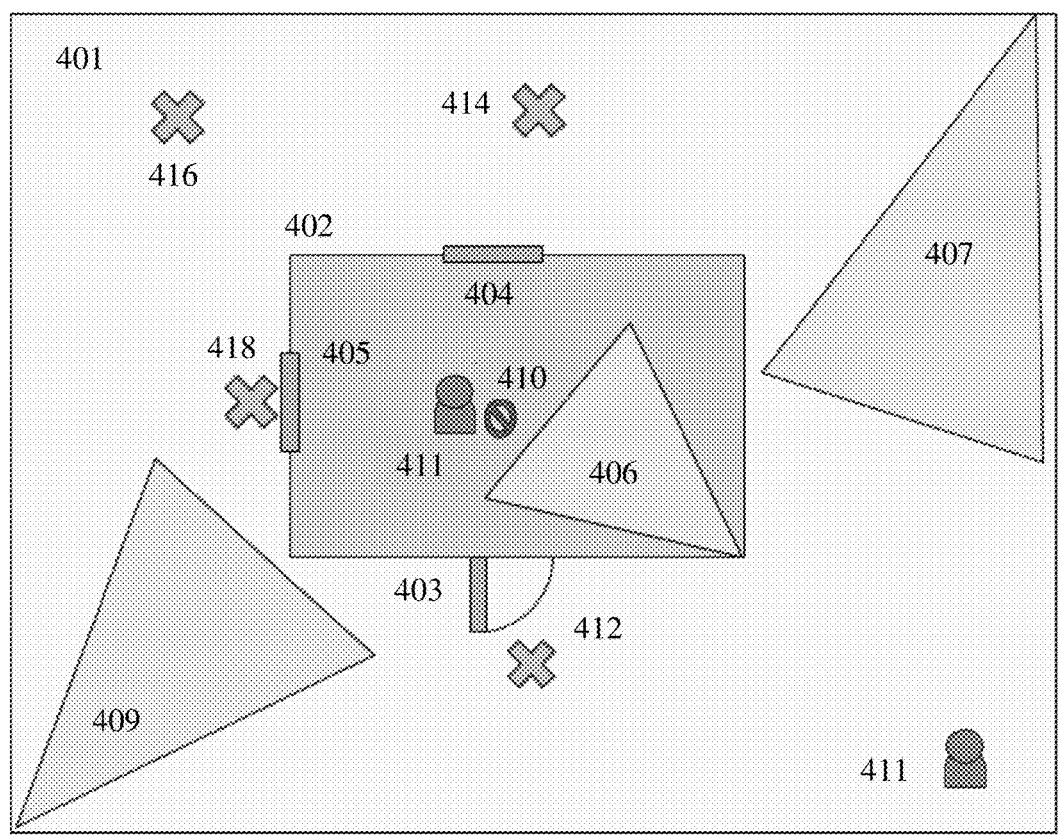
FIG. 4 is a graphic display of a building being monitored by various security systems and certain identified areas within the geospatial boundary.

The geospatial boundary is exemplified in FIGS. 2 and 4 by the boundary lines 201 and 401, which may be digitally represented by geofences. Moreover, the system may include a program for manually inputting or adjusting the digital geospatial boundary of any given security site. This may be accomplished on the SMP by allowing an SMP operator to draw or insert a polygon of any necessary shape to denote the patrol-able area.

An embodiment includes an option for manually identifying and storing the initial or current patrol routes that were established prior to the implementation of the present invention. The novel system and process also has access to a data store that collects and stores historical security alert information. The data store may be an existing data store operating in concert with the SMP or may be added to the enterprise when the present invention is employed.

Figure 3:
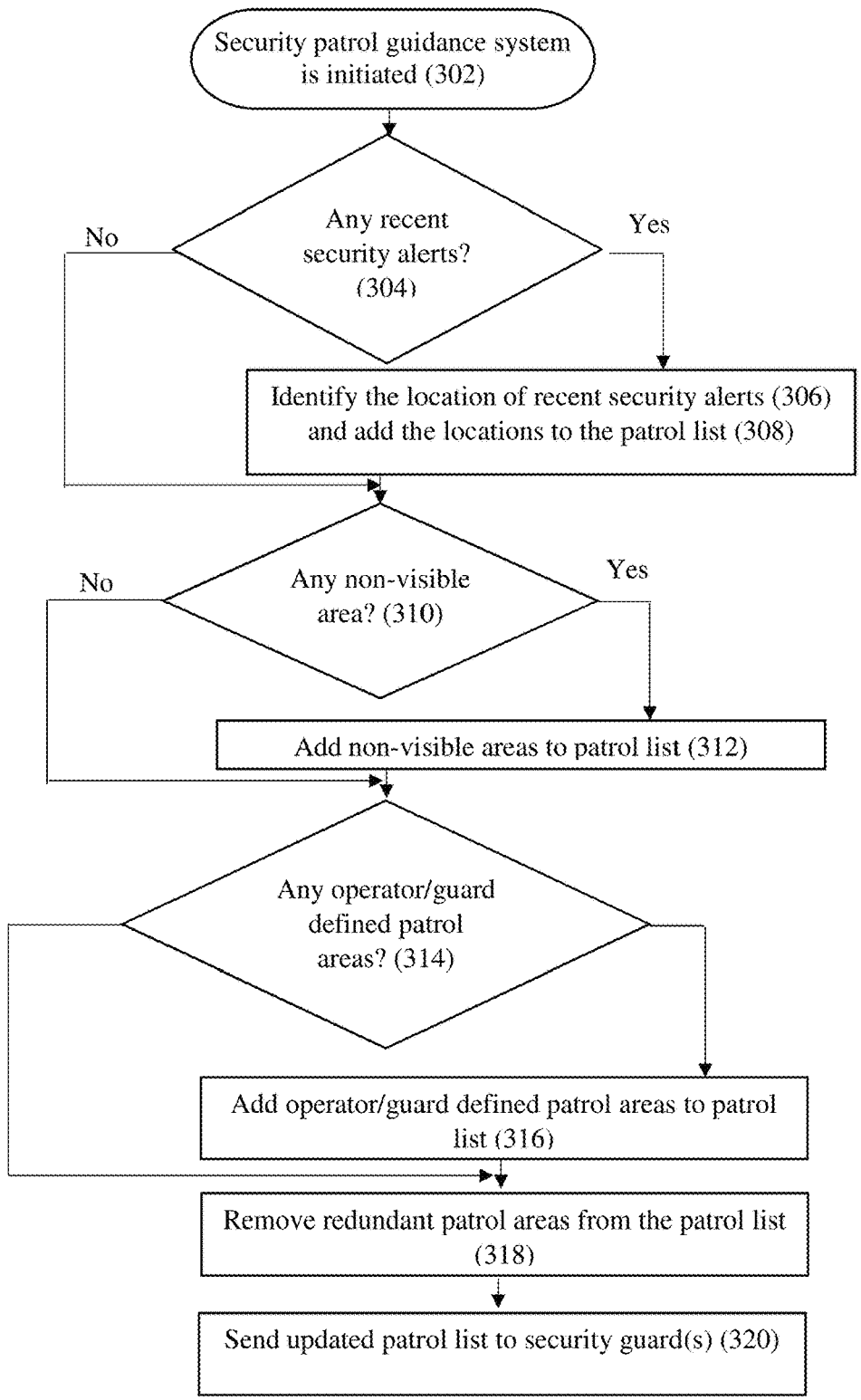
FIG. 3 is a flowchart of an embodiment of the novel process.

Referring now to FIG. 3, an embodiment of the novel process of the present invention is initiated at step 302 to automatically and dynamically calculate areas that need to be patrolled by security guards. The security patrol guidance system accesses a data store having historical security alert data to determine whether there have been any security events within a, preferably user-configurable, timeframe (e.g., within seven days) at step 304. An embodiment includes additional factors, including but not limited to, whether the security alert rises above a certain, preferably user-configurable, priority level; whether the security alert occurred inside the geospatial boundary or within a certain, preferably user-configurable, distance of the geospatial boundary (e.g., within twenty feet). Collectively, these factors are referred to hereinafter as determinative factors having a base threshold.

At step 306, if a security alert occurred within the defined timeframe, or meets a minimum threshold of a determinative factor, the security patrol guidance system identifies the location of the security alert based on the location-based technology or the stored location information corresponding to the SMA that initiated that security alert. The corresponding location is then added to a list of areas to be patrolled by the security guards at step 308. If there were no security alerts within the designated timeframe, the system moves to step 310.

In an embodiment, the above determinative factors may be ranked in level of importance and the system then analyzes whether a minimum threshold of importance has been reached. Alternatively, the system may be configured such that if any of the determinative factors are met or a certain number of determinative factors have been met, i.e. a security alert occurs within the set timeframe, the security alert is above a threshold priority, or the security alert occurs within a certain distance of the geospatial boundary, then the location of that security alert is added to patrol route of a security guard.

At step 310, the security patrol guidance system assesses whether there are any areas within the geospatial boundary that are not covered by a cameras field of view. First, the field of view of the cameras must be determined and digitally stored on the system. By comparing the geospatial boundary with the field of view of each camera, the security patrol guidance system can identify areas within the geospatial boundary that are not covered by the collection of cameras, which are referred to hereinafter as non-visible areas. These non-visible areas are then added to the list of areas to be patrolled at step 312. If there are no non-visible areas, the system moves to step 314.

To avoid infinitesimal portions of non-visible areas being added to the patrol list, an embodiment of the security patrol guidance system creates a polygon that mirrors the collective non-visible areas. The system then overlays one or more dividing polygons, such as circles, having for example a radius of thirty feet, to divide the non-visible area to be patrolled into a plurality of smaller subareas. The center points of these subareas are added to the patrol list. The subareas may have any shape and any size to divide the representative polygon of the collective non-visible areas. For example, a rectangular geospatial boundary may be subdivided into equally sized rectangular subareas.

Following the addition of non-visible areas to the patrol list, the security patrol guidance system identifies any SMP operator/guard defined patrol areas at step 314. Again, these areas can be defined by some geometric shape to section off more than just an infinitesimal location. Preferably, both the SMP operator and security guards can input predetermined patrol areas. These predetermined patrol areas are also added to the patrol list at step 316. If there are no operator/guard defined patrol areas, the system moves to step 318.

After any of the steps 306, 310, and 314, the system can alternatively proceed directly to the step 318. This alternate process will be dependent on whether the system includes cameras and allows for operator and guards to manually defined patrol areas.

At step 318, the security patrol guidance system reviews the list of areas generated from the previous steps in view of security guard position data and camera coverage data. At step 320, areas are removed from the patrol list if either 1) a security guard is currently present or was present in one of the areas on the patrol list within a defined timeframe (e.g., within ten minutes) or 2) one of the areas on the patrol list is fully or partially covered by the field of view of a camera. The level of coverage can be defined and adjusted by the SMP operator. The security guards' location information is received by the SMP via constant or periodic communication with the location-based technology integrated with robotic security guards and the location-based technology integrated with the mobile devices carried by the human security guards. As explained above, each camera's field of view can be manually inputted into the system.

Once the redundant areas are removed from the patrol list, the security patrol guidance system sends the updated patrol list to the security guards at step 320. The transmission of the updated patrol list is achieved via wireless communication. Any type of wireless communication may be employed, so long as the type of communication is receivable by the location-based technology possessed by the security guards. The transmitted patrol list may be transmitted as data or in a verbal context.

In an embodiment, the patrol list is sent to the security guards with each patrol area identified by a GPS coordinate. In addition, or alternatively, each patrol area may be identified on a map and navigational directions may be provided to direct the security guard to each patrol area.

The security patrol guidance system continues to monitor the location of the security guards and periodically cycles through steps 302-320 to ensure that the facility is secure.

Referring now to FIGS. 3-4, the simple illustration in FIG. 4 helps to explain how the security patrol guidance system cycles through steps 302-320. In FIG. 4, area 410 is an operator defined patrol area that is currently occupied by a security guard, area 412 is an operator defined patrol area, areas 414 and 416 are non-visible areas, and area 418 is the location of a recent security alert corresponding to window 405 being forced open. At steps 304-308, area 418 is added to the patrol list; at steps 310-312, areas 414-416 are added to the patrol list; and at steps 314-316, areas 410-412 are added to the patrol list. Then at step 318, area 410 is removed from the patrol list on account of security guard 411 being in/near area 410. Finally, at step 320, the updated patrol list is transmitted to security guards 411 (human via the mobile device or robot via the API integration). The system continues to track the location of security guards 411 as they complete their patrol.

Figure 5:
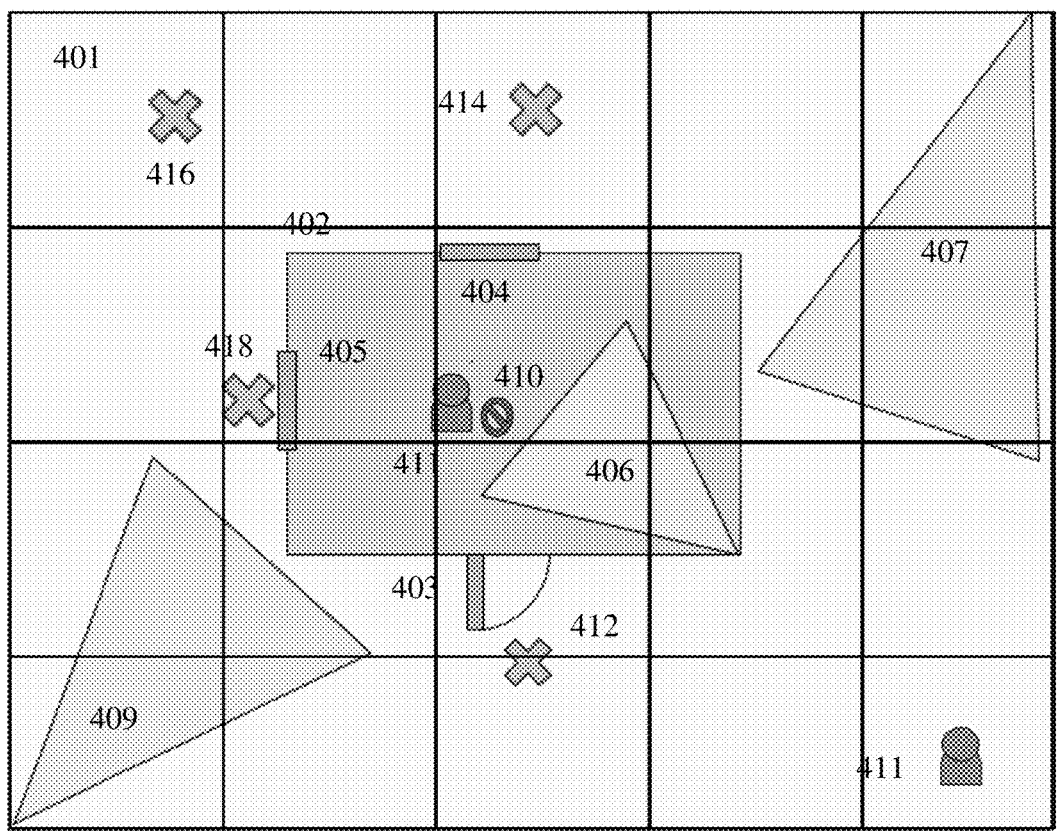
FIG. 5 is an exemplary graphic display presented to an SMP operator showing the geospatial area divided into subareas.

Referring now to FIG. 5, an embodiment may present a graphic display to the SMP operator which includes a representative layout of the geospatial boundary 401, the object of interest, the SMAs, the field of view of each camera, and the areas identified as non-visible. As depicted the area contained within the geospatial boundary is subdivided into subareas. Each subarea is identifiable either through location-based information or through a grid-style nomenclature. In this embodiment, the non-visible areas are calculated based on a percentage of the subarea that is visible. If, for example, less than 75% of the subarea is visible, that area is deemed to be a non-visible area. The percentage can be adjusted by the SMP operator.

An embodiment includes a manual adjustment or override command for changing the patrol routes. An embodiment further includes a patrol route selection protocol that allows a security guard to select one of the areas on the patrol list as an area in which the security guard intends to travel. The selection protocol notifies the other security guards that the area is being processed to avoid multiple security guard patrolling the same area and thus duplicating efforts.

An embodiment of the security patrol guidance system also compares current security guard locations to the list of patrol areas and then divvies up the patrol areas on the patrol list based on the location of each security guard to each patrol area.

An embodiment includes a manual adjustment or override command for changing the patrol routes, so that the SMP operator or security guards can make split second decisions and relay that information if needed.

Glossary of Claim Terms

Area: is a region or part of the territory occupied within the geospatial boundary. The region or part may be set in size, such that the territory occupied within the geospatial boundary is equally divided into a plurality of areas.

Data Store: is any hardware or software capable of storing information.

Geospatial Boundary: is a digital or computational boundary that is associated with a particular location.

Location-Based Technology: is a device configured to provide the location of something or someone.

Mobile device: is a portable communication/computing device such as a smartphone.

Object of Interest: is any facility, object, or being that the security systems are intended to protect.

Security Guard: is a mobile monitoring device or living being.

Security Monitoring Asset: is any monitoring object, including, but not limited to, alarm sources, video sources, outputs, security guards, audio sources, and situational awareness devices to provide information outside of traditional alarm sources, such as earthquake and weather warnings.

Security-Monitoring Platform: is a system in communication with one or more security systems designed to allow an operator to monitor and sometimes control the security system and its electronic security monitoring assets.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A computer implemented method for automatically creating and sending security patrol guidance information to security guards, comprising:
    establishing a geospatial boundary around an object of interest;
    establishing wireless communication between a security-monitoring platform and location-based technology in a security guard's possession;
    determining whether any security alerts occurred within a defined timeframe;
    if a security alert occurred within the defined timeframe, adding the location of the security monitoring asset responsible for the security alert to a patrol list;
    accessing the location-based technology in the security guard's possession to determine if the security guard is currently or has been in within a geographical zone encompassing the location of the security monitoring asset responsible for the security alert within a second defined timeframe;
    if the security guard is currently in or has been in within the geographical zone within the second defined timeframe, removing the location of the security monitoring asset responsible for the security alert from the patrol list;
    determining whether there are any areas within the geospatial boundary that are not in a field of view of a camera;
    if there is an area not within the field of view of a camera, adding the area to the patrol list; and
    transmitting the patrol list to the security guards via wireless communication between the security-monitoring platform and the location-based technology in the security guard's possession.

2. The method of claim 1, further including identifying and adding any operator-defined patrol areas to the patrol list.

3. The method of claim 1, wherein the step of determining whether any security alerts occurred within the defined timeframe includes accessing a data store that records historical security alert information and comparing a current date and time with a date and time of the historical security alert information.

4. The method of claim 1, further comprising inputting field of view information for each camera into a data store that is accessible by the security-monitoring platform.

5. The method of claim 4, wherein the step of determining whether there are any areas within the geospatial boundary that are not in a field of view of a camera includes accessing the field of view information via the security-monitoring platform.

6. The method of claim 1, further including storing location information for each static security monitoring asset in a data store accessible by the security-monitoring platform.

7. The method of claim 1, further including subdividing the geospatial boundary around the object of interest into a plurality of subareas, the subareas each being identifiable based on location information.

8. A method for automatically creating and sending security patrol guidance information to security guards, comprising:
    establishing a geospatial boundary around an object of interest, subdividing the geospatial boundary into subareas with each subarea having an identifiable location within the geospatial boundary;
    establishing wireless communication between a security-monitoring platform and location-based technology in a security guard's possession;
    determining whether any security alerts occurred within a defined timeframe;
    if a security alert occurred within the defined timeframe, adding the location of the security monitoring asset responsible for the security alert to a patrol list;
    accessing the location-based technology in the security guard's possession to determine if the security guard is currently or has been in within a geographical zone encompassing the location of the security monitoring asset responsible for the security alert within a second defined timeframe;
    if the security guard is currently in or has been in within the geographical zone within the second defined timeframe, removing the location of the security monitoring asset responsible for the security alert from the patrol list;
    determining whether there are any subareas within the geospatial boundary that are not in a field of view of a camera;
    if there is a subarea not within the field of view of a camera, adding the subarea to the patrol list; and
    transmitting the patrol list to the security guards via wireless communication between the security-monitoring platform and the location-based technology in the security guard's possession.

9. The method of claim 8, further including identifying and adding any operator-defined patrol areas to the patrol list.

10. The method of claim 8, wherein the step of determining whether any security alerts occurred within the defined timeframe includes accessing a data store that records historical security alert information and comparing a current date and time with a date and time of the historical security alert information.

11. The method of claim 8, further comprising inputting field of view information for each camera into a data store that is accessible by the security-monitoring platform.

12. The method of claim 11, wherein the step of determining whether there are any areas within the geospatial boundary that are not in a field of view of a camera includes accessing the field of view information via the security-monitoring platform.

13. The method of claim 8, further including storing location information for each static security monitoring asset in a data store accessible by the security-monitoring platform.

14. A security patrol guidance system, comprising:
a security monitoring platform configured to communicate with one or more security systems through application programming interfaces;
each security system having one or more security monitoring assets;
a mobile device intended to reside with each security guard, the mobile device having location-based technology that can transmit location-based information to the security monitoring platform;
a patrol guidance program adapted to perform the following automated steps:

determining whether any security alerts occurred within a defined timeframe;
if a security alert occurred within the defined timeframe, adding the location of the security monitoring asset responsible for the security alert to a patrol list;
accessing the location-based technology in the security guard's possession to determine if the security guard is currently or has been in within a geographical zone encompassing the location of the security monitoring asset responsible for the security alert within a second defined timeframe;
if the security guard is currently in or has been in within the geographical zone within the second defined timeframe, removing the location of the security monitoring asset responsible for the security alert from the patrol list;
determining whether there are any areas within the geospatial boundary that are not in a field of view of a camera;
if there is a subarea not within the field of view of a camera, adding the area to the patrol list; and
wirelessly transmitting the patrol list to the security guards from the security-monitoring platform to the mobile device.

15. The system of claim 14, further including identifying and adding any operator-defined patrol areas to the patrol list.

16. The system of claim 14, further comprising inputting field of view information for each camera into a data store that is accessible by the security-monitoring platform.

17. The system of claim 16, wherein the step of determining whether there are any areas within the geospatial boundary that are not in a field of view of a camera includes accessing the field of view information via the security-monitoring platform.

* * * * *